United States Patent [19]
Turner

[11] 3,930,522
[45] Jan. 6, 1976

[54] STRUCTURAL CERAMIC ARTICLE AND METHOD OF MAKING SAME

[75] Inventor: Charles Lamar Turner, Delran, N.J.

[73] Assignee: General Refractories Company, Philadelphia, Pa.

[22] Filed: May 2, 1973

[21] Appl. No.: 356,363

[52] U.S. Cl. ............ 138/111; 23/288 F; 252/477 R
[51] Int. Cl.² ........................ B01J 8/06; F16L 9/16
[58] Field of Search ........ 23/288 FC; 138/111, 115; 161/68, 139; 252/477 R

[56] References Cited
UNITED STATES PATENTS

| | | | |
|---|---|---|---|
| 2,742,437 | 4/1956 | Houdry | 252/477 |
| 3,295,919 | 11/1967 | Henderson et al. | 23/288 |
| 3,502,596 | 3/1970 | Sowards | 252/477 |
| 3,568,723 | 3/1971 | Sowards | 138/111 |
| 3,641,763 | 9/1970 | Cole | 23/288 X |
| 3,790,654 | 2/1974 | Bagley | 264/177 |
| 3,799,796 | 3/1974 | Hunter | 23/288 X |
| 3,824,196 | 7/1974 | Benbow et al. | 252/477 X |

FOREIGN PATENTS OR APPLICATIONS

| | | | |
|---|---|---|---|
| 1,189,404 | 4/1970 | United Kingdom | 264/109 |

Primary Examiner—Herbert Goldstein
Attorney, Agent, or Firm—Everett H. Murray, Jr., Esq.; Brian G. Brunsvold, Esq.

[57] ABSTRACT

Sintered ceramic articles having a high surface area-to-weight ratio and containing a plurality of ducts that extend through the article to permit fluid flow therethrough are prepared by forming an extrudable admixture of pulverized ceramic material. The admixture is forced through a forming zone in which initial shearing forces form the admixture into a plurality of discrete ribbons, and the discrete ribbons are flowed into the upstream ends of a plurality of spaced, longitudinally-extending members to form a web member containing a plurality of longitudinally-extending ducts as the ribbons flow together about the members. Monolithic ceramic structures formed by the above-described process and including hexagonally-packed circular ducts, that is, circular ducts surrounded by six other circular ducts with each surrounding duct spaced an approximately equal distance from the axis of the circular duct it surrounds, exhibit a desirably high ratio of transverse compressive strength to longitudinal compressive strength.

4 Claims, 8 Drawing Figures

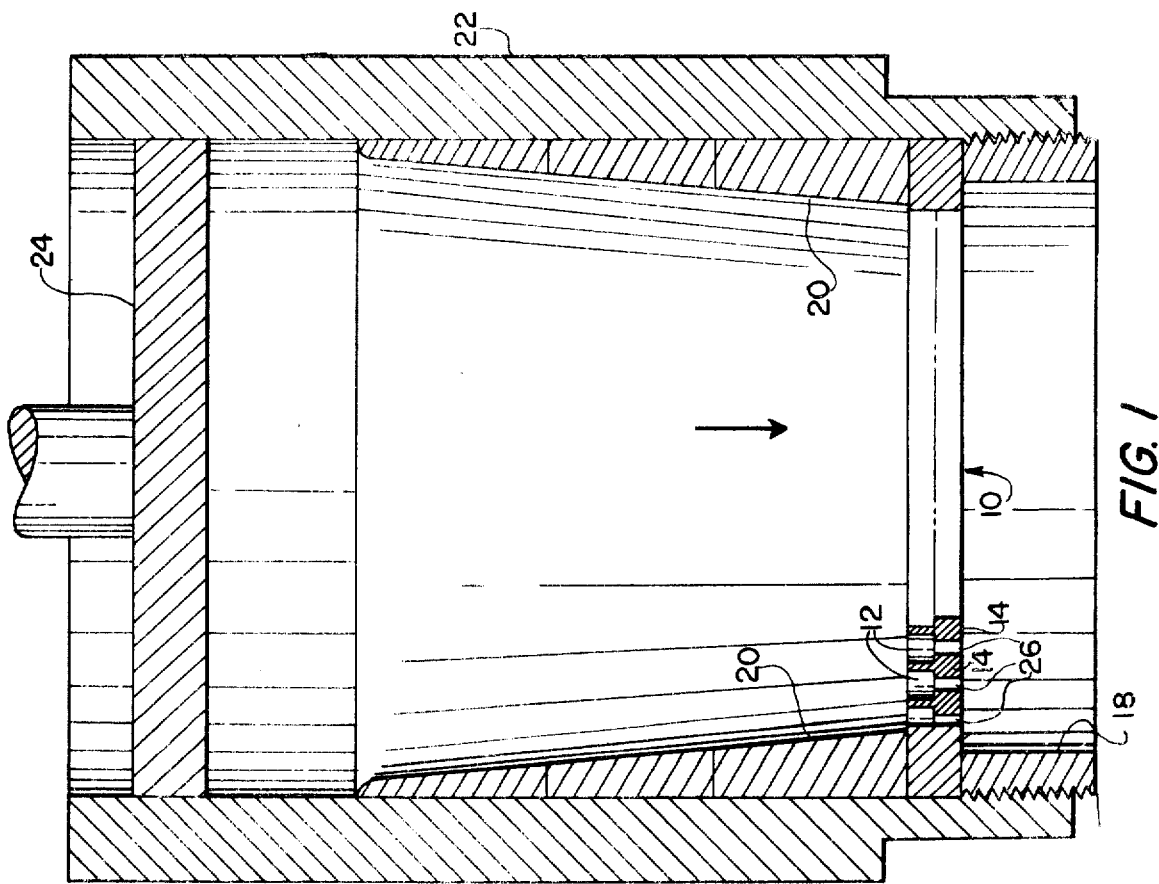
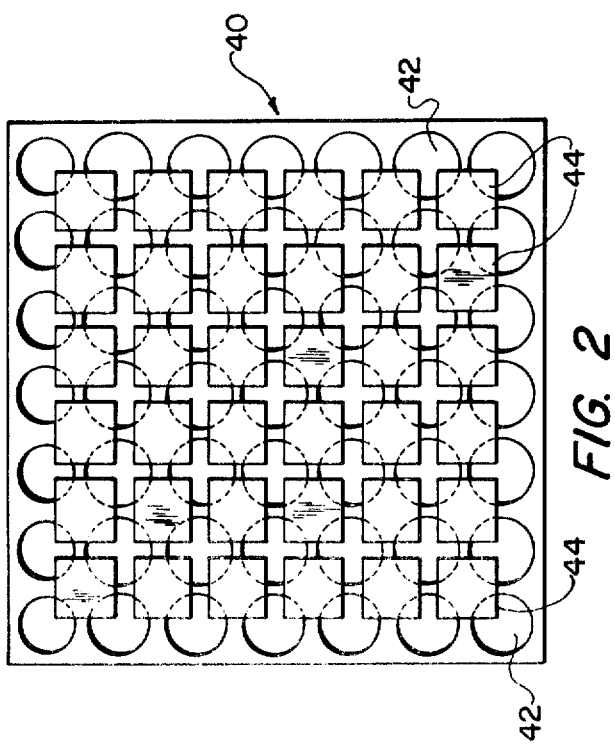
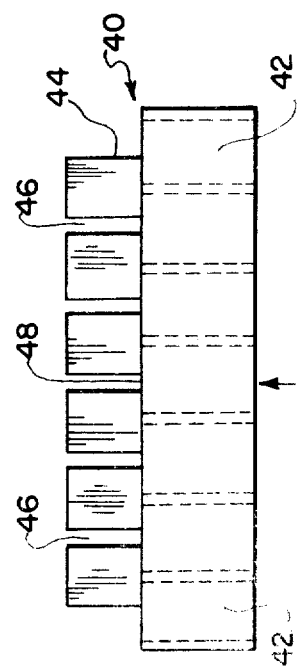

STRUCTURAL CERAMIC ARTICLE AND METHOD OF MAKING SAME

FIELD OF THE INVENTION

This invention relates to heat-resistant, thermally-rigidized structural articles, and to methods for producing such articles. More particularly, the invention is directed to rigid, sturdy, sintered ceramic, high surface-to-weight structural components having as an essential part thereof closely-spaced, longitudinally-extending ducts of small cross-section, and to methods of forming such articles.

While a presently preferred embodiment of the invention will be described as a catalyst support for use in automotive pollution control systems, the ceramic articles of this invention have other uses, such as catalyst supports in other systems, as heat exchange materials, as heat storage elements, and as heat insulating materials.

BACKGROUND OF THE INVENTION

The need for strong, thermally-stable catalyst supports for use in automobile exhaust pollution control systems has led to intensive research and development efforts by numerous companies. Pollution control reactors must withstand normal operating temperatures as high as 2000°F. In addition, they must operate efficiently with gas temperatures, pressures, compositions, and velocities that fluctuate rapidly over wide ranges, and they must withstand the mechanical shocks and vibrations of vehicle operation.

The task of finding substrates that will stand up to these severe operating requirements has been formidable.

The size and weight criteria imposed by the auto industry require a catalyst support having a high surface area per unit of volume. While monolithic ceramic materials are a good choice for such catalyst supports based on costs, strength, and thermal stability, a major drawback to the use of ceramic materials has been the development of a suitable process for fabricating a high strength, high surface area monolithic product at a reasonable cost.

BRIEF DESCRIPTION OF THE INVENTION

The invention provides a process of preparing ceramic articles having a honeycomb structure. Pulverized ceramic material is thoroughly admixed with a binder, and a plasticizing agent to form an extrudable admixture that is shape-retaining and self-supporting, and that will flow under pressure. A longitudinally continuous bar of admixture is then forced through a tranversely enclosed forming zone. Initial shearing forces are applied to the admixture in the forming zone to form the bar of admixture into a plurality of discrete ribbons. Duct-forming shearing forces are applied on each of the discrete ribbons within the forming zone by flowing outside portions of the ribbons at the upstream ends of a plurality of spaced, longitudinally-extending members positioned within the forming zone to divert outside portions of each of the ribbons and thus form a webbed member containing a plurality of longitudinally-extending ducts as the ribbons flow together about the spaced members. The webbed member is cut into articles of discrete length, and the duct-containing articles are subsequently dried and fired.

Preferably, the transverse cross-section of the admixture flowing through the forming zone is reduced during passage through the forming zone so that the cross-sectional area of the webs of the webbed member is about 65%–99%, and optimally about 75%, of the sum of the cross-sectional area of the discrete ribbons in a plane perpendicular to the flow direction of the admixture in the forming zone.

It is also preferred that the forming zone be less than about 1 inch long and that the duct-forming shearing forces be exerted on the admixture during the last 0.090–0.15 in. of the passage of the admixture through the forming zone.

It is further preferred that the articles of discrete length be fired to their maturing temperature while shielded from direct radiant heat from the heating source at a rate of temperature increase of no more than about 100°C/hour, and that the rate of temperature increase during firing be no more than about 50°C/hour as the articles are heated from about 1080° to 1400°C.

The invention also provides useful ceramic articles comprising a plurality of webs, with a plurality of parallel circular ducts that are separated by the webs extending across the article to provide for fluid flow through the article. A majority of the parallel circular ducts are surrounded by six other circular ducts with the axes of the six surrounding ducts being spaced an approximately equal distance from the axis of the circular duct they surround. The number of ducts per square inch of article surface in a plane transverse of the parallel axes of said ducts is at least 100 to provide a high surface area per weight ratio. Such an article has a transverse compressive strength of at least about 5% of its longitudinal compressive strength. For example, the article may contain circular ducts having a diameter of about 0.55 in., and about 255 circular ducts per square inch of article surface in a plane transverse of the axes of the ducts.

The process of this invention lends itself to the production of ceramic articles on a high volume low cost basis, and makes possible the production of catalyst supports that are attractive for use in automotive exhaust systems. The process can produce ceramic articles having a uniform cross-section and containing a large number of small, closely-spaced, longitudinally-extending ducts.

The raw materials used in making ceramic articles in accordance with the invention are relatively inexpensive, and are readily available in large quantities. Both of these factors are important considerations with respect to a high volume market, such as for use in automotive pollution control systems.

The presently preferred embodiment of the invention, in which longitudinally-extending circular ducts are hexagonally-packed, provides transverse compressive strengths that are significantly superior to that attained by any other known monolithic ceramic article of comparable surface area/volume ratio. Specifically, transverse compressive strengths of between about 400–700 psi are attained for cordierite articles. All prior art attempts at producing closely packed ducts in cordierite articles have produced articles that exhibit a transverse strength of about 50 psi along one transverse axis. Surprisingly, the fired, hexagonally-packed ceramic articles feel resilient to the touch when compressive force is applied to them.

BRIEF DESCRIPTION OF THE DRAWINGS

Of the drawings:

FIG. 1 is a sectional view of an extrusion apparatus for practicing the process of this invention;

FIG. 2 is a plan view of the downstream face of a die plate member for forming a square celled ceramic article in accordance with the invention;

FIG. 3 is an elevation view of the die plate member of FIG. 2;

DETAILED DESCRIPTION OF PREFERRED EMBODIMENTS OF THE INVENTION

In accordance with the invention, a process for preparing monolithic ceramic articles having a honeycomb structure is provided in which pulverized ceramic material is thoroughly admixed with a binder and water to form an extrudable admixture that is shape-retaining and self-supporting, and will flow under pressure.

A variety of known sinterable ceramic materials that can be made plastic (i.e. that will flow under pressure upon the addition of a plasticizing agent) are suitable for use in the process of this invention.

The term "plasticizable ceramic composition" as used in the specification and claims means an inorganic substance or substances in the crystalline or amorphous state which can be caused to flow under pressure, but is not fluid, and that is shape-retaining and evidences substantially no flow characteristics when non-supported. For example, refractory compositions, such as magnesium silicates, magnesia, zirconia, zirconium silicate, cordierite, corundum, aluminum silicates, aluminum titanate, lithium aluminum silicate and silica or a combination of such materials are all suitable for the present purpose.

Figure 6:
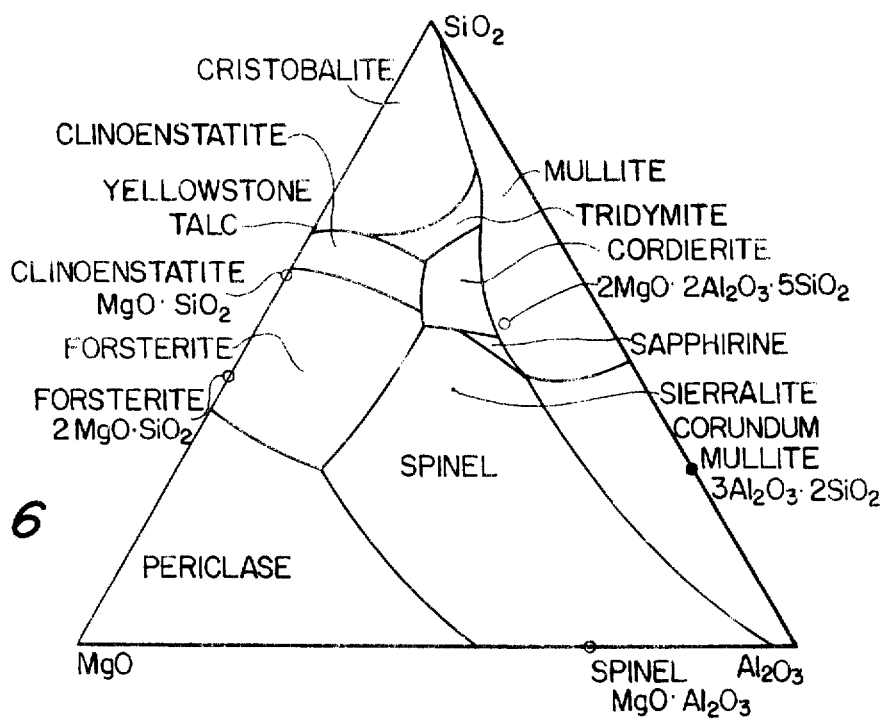
FIG. 6 is a phase diagram illustrating the general types of ceramic material produced by various $MgO \cdot Al_2O_3 \cdot SiO_2$ raw material ratios.

A refractory composition which consists of cordierite when sintered is particularly suitable for making catalyst support articles which require low thermal expansion and high thermal shock resistance. FIG. 6 is a triangular phase diagram that illustrates the well-known $MgO \cdot Al_2O_3 \cdot SiO_2$ ratios which can be used to produce cordierite. However, the method of the invention is not dependent on the sinterable ceramic material selected, and hence the material which has the most suitable properties for the conditions of its use can be selected.

It is desirable that the ceramic material be pulverized to an average particle size sufficiently small to insure easy passage of the mix through the forming zone (the die plate of the extruder) used in accordance with the invention. Preferably, the ceramic material will all pass a 200 mesh screen and optimally it is all −325 mesh material.

In forming the ceramic composition, it is desirable to mix the dry ingredients thoroughly before addition of water or other liquid-containing materials to promote plasticity of the mixture. Generally, a mixing time of about 5 minutes for the dry materials is sufficient. However, if extremely fine particle materials are utilized, (all −325 mesh) longer mixing times of up to 10 minutes may be necessary to insure good dispersion.

After dry mixing, the required amount of water or other liquid to promote plasticity is added to the batch. Thorough blending of the liquid and solid ingredients is necessary to impart extrusion consistency to the batch and to insure a well-formed, cross-sectional shape for the article. The wet blending times generally range between 5 and 10 minutes and can be performed in less than 2 minutes. In general, when the ceramic material includes a clay of high plasticity, from 10 to 20 parts by weight of water per hundred parts by weight of clay are utilized.

Water, the preferred wetting media, should desirably be water at a constant pH, preferably 7.0. Differences in the pH of the water can affect the surface activity and workability of the clays and other ingredients used. Thus, the use of water of varying pH may introduce variables in the processing characteristics of the admixture.

Plasticizing agents which can be utilized include wax, gum, and colloidal magnesium aluminum silicate.

Desirably, a binder is included in the admixture to impart coherence and strength to the formed article. The binder can be an inorganic binder or an organic binder. Suitable inorganic binders include colloidal magnesium aluminum silicate and sodium silicate. Suitable organic binders include methylcellulose, polyvinyl alcohol, paraffin and gum arabic. The binder preferably comprises about 0.5 to 2.0% by weight of the total solids in the admixture.

A surface active agent, such as sodium ligno-sulfonate solution, or "Darvan C" solution, sold by R. T. Vanderbilt Co., is an optional ingredient. The purpose of the surface active agent, if used, is to aid in the dispersion of the ingredients in the extrusion mixture.

A longitudinally continuous bar of admixture prepared as described above is forced through a transversely enclosed forming zone, such as is provided by a conventional ram-type extruder. Initial shearing forces are applied to the admixture in the forming zone to form the bar of admixture into a plurality of discrete ribbons. Preferably, these initial shearing forces are applied by forcing the bar of admixture at a linear speed of between about 5 and 200 inches of product per minute through the upstream face of a forming die having the cross-section illustrated in FIGS. 1 and 4 to produce a plurality of ribbons having a circular cross-section.

Duct-forming shearing forces are exerted on each of the discrete ribbons within the forming zone by forcing outside portions (portions at the outside of the cross-section of each discrete ribbon) of the ribbons at the upstream ends of a plurality of spaced, longitudinally-extending members that are positioned within the forming zone. The longitudinally-extending members divert outside portions of each of the ribbons and thus form a webbed member containing a plurality of longitudinally-extending ducts as the ribbons flow together about the longitudinally-spaced members.

FIG. 1 illustrates an embodiment of an apparatus for carrying out the process of this invention. It is presently preferred to extrude horizontally, and to deposit the extrudate on a conveying means that moves away from the die plate at about the same rate of speed that the material passes through the die plate.

With reference to FIG. 1, a die plate member generally 10 is illustrated that includes a plurality of circular passages 12 on its upstream face and a plurality of cylindrical pins 14 on its downstream face. The relative alignment and spacing of passages 12 and pins 14 is illustrated in FIG. 4.

As illustrated in FIG. 1, the die plate member 10 is held by a retainer ring 18 against a nozzle member 20 that is welded to barrel member 22 of the extruder.

Figure 4:
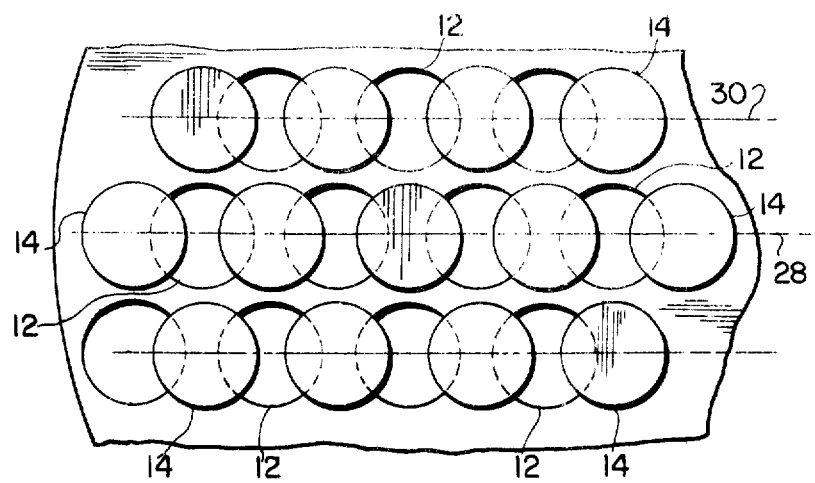
FIG. 4 is an enlarged fragmentary plan view of the downstream face of the die plate member illustrated in FIG. 1.

As illustrated in FIGS. 1 and 4, the plate member 10 has an upstream face comprising a plurality of closely spaced, longitudinally-extending passages 12 which permit flow of material through the upstream face of plate member 10 in the form of a plurality of discrete ribbons. The downstream face of plate member 10 is formed by a plurality of transversely spaced cylindrical pins 14. Each of the pins has a closed circular perimeter in a plane transverse of the direction of the material flow through plate member 10, and extends longitudinally of the flow direction. Each pin 14 is separated from other pins by an interconnected recessed area 26. The cross-section of recessed area 26 is selected to have the desired cross-section of the product being formed by extrusion through the die and is uniform throughout the length of pins 14.

Passages 12 terminate at the upstream end of recessed area 26 with the axes of passages 12 aligned generally parallel to the flow direction of material through plate member 10. This flow direction is preferably transverse of the upstream face of plate member 10. Passages 12 terminate at a plurality of spaced locations, with a pair of pins 14 blocking a portion of the cross-section of each of passages 12 to force the material being extruded to fill the entire volume of the recessed area 26 between the upstream end of the recessed area and the exit face of plate member 10. As used in this specification and the claims, the term "exit face" or "downstream face" of the plate member refers to the plane extending through the downstream end of the spaced members (pins 14). The term "upstream face" or "inlet face" of plate member 10 refers to the plane of the other face of plate member 10, which was a flat planar surface prior to removal of material to form passages 12.

Preferably, and as illustrated in FIGS. 1 and 4, passages 12 are cylindrical, and pins 14 are cylinders. In the illustrated embodiment, a pair of cylindrical pins 14 extend into the flow path of the material out the exit end of all passages 12 except those at the perimeter of plate member 10 where only a single pin extends into the flow path of the peripheral passages. Thus, a pair of pins extends into the flow path of a majority of cylindrical passages 12.

As best illustrated in FIG. 4, spaced cylindrical passages 12 terminate at locations that are spaced about the periphery of the upstream end of each of pins 14. This spacing permits discharge of material from passages 12 at a plurality of locations about the periphery of each pin 14 and helps insure that the desired intricate cross section of the articles can be achieved during only a short length of flow through the downstream portion of the plate member.

Preferably, and as illustrated in the embodiment of FIGS. 1 and 4, any given cylindrical pin 14 is surrounded by six other cylindrical pins 14, except for pins located adjacent the perimeter of plate member 10. Each of the six cylindrical pins spaced about a given pin 14 has its axis spaced approximately an equal distance from the axis of the given cylindrical pin.

Figure 5:
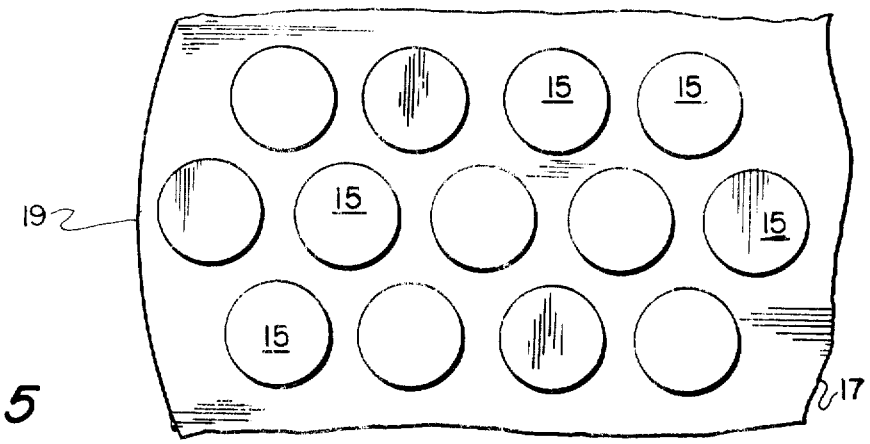
FIG. 5 is an enlarged fragmentary end view of one embodiment of the ceramic article of this invention.

The resulting product formed by extruding past pins 14 spaced as above produces hexagonal packing of the longitudinally-extending ducts as illustrated in FIG. 5. This arrangement permits forming an extremely high number of small diameter ducts 15 per square inch of extruded article 17 and enhances the strength properties of the extruded article and particularly the resistance to transversely applied compressive forces. The article 17 illustrated in FIG. 5 has a smooth cylindrical longitudinal wall surface 19 that is desirable for some applications, such as in automotive emission control systems.

It is possible to utilize over 100 pins per square inch of downstream face of plate member 10 and thus provide over 100 ducts per square inch. Indeed, dies having pin densities of over 190 per square inch have been made and used to successfully extrude uniform ceramic articles that have over 200 ducts per square inch after firing.

As illustrated in FIGS. 1 and 4, the passages 12 extend transversely of the upstream face of plate member 10 and are aligned with the direction of flow to permit flow of material through the upstream face with a minimum of pressure drop. It is also preferred that the ratio of the cross-sectional area of the recessed area 26 to the combined cross-sectional area of passages 12 be between 0.65 and 1.0, with optimum results for extruding ceramic mixes presently being achieved with a ratio of about 0.75.

In the extrusion of ceramic material, it has also been found desirable to make the length of pins 14 from about 0.090–0.15 inches. If the length of pins 14 is less than 0.090 in., it has been found that it is difficult to achieve finished articles having uniform cross sections. If the length of pins 14 is more than 0.15 in., excess extrusion pressures must be used to counteract the increased frictional resistance of a plastic ceramic mix in prolonged contact with pins 14.

The desirable length of passages 12 is similarly determined by (a) the need to achieve uniform flow across each passage before material reaches recessed area 22 and (b) the need to minimize frictional resistance of the die plate member to material flowing therethrough. Generally, the length of passages 12 can vary from 0.100 to 0.500 in. with about 0.250 in. being presently preferred.

The die plate 10 is desirably formed of hot rolled, low-carbon steel for ease of machining. The crystal direction of the steel should be aligned with the direction of milling so that it is not necessary to drill or mill across the crystallographic axis. Preferably, the die plate member is coated prior to use with electroless nickel to a thickness of 0.002 in. Equally satisfactory results have been obtained using dies machined from solid plastic.

As best illustrated in FIG. 4, a presently preferred alignment of the passages and pins for purposes of ease of fabrication, and for ensuring uniform distribution of the material about pins 14, is provided by aligning the axes of pins 14 and passages 12 in a plurality of parallel planes. The repeating sequence along a given plane, such as depicted by center line 28 in FIG. 4, comprises: (1) pin, (2) passage, (3) pin. The axis of a passage is spaced about midway along plane 28 between the adjacent axes of the pins. The axes of individual pins in plane 30 adjacent to given plane 28, are (a) offset horizontally with respect to FIG. 4, from the position of the axes of the pins in plane 26, and (b) are approximately vertically aligned with the axes of passages 28 in plane 26.

FIGS. 2 and 3 disclose another embodiment of a die that can be used in accordance with the process of this invention. This embodiment is designed for extruding ceramic articles having a plurality of longitudinally-extending rectangular ducts.

The die of FIGS. 2 and 3 comprises an integral plate member, generally 40, having an upstream face comprising a plurality of spaced circular passages 42 which permit flow of material through the upstream face of plate member 40. The downstream face of plate member 40 is formed by a plurality of transversely spaced rectangular pins 44 preferably having a square cross-section. Each of the pins has a closed rectangular perimeter in a plane transverse of the direction of the material flow through plate member 40, and extends longitudinally of the flow direction. Each pin 44 is separated from other pins by an interconnected recessed area 46 that has the desired cross-section of the product being formed by extrusion through the die.

Passages 42 terminate longitudinally at the upstream end 48 of recessed area 46 with the longitudinal axis of each passage 42 aligned generally parallel to the flow direction of material through plate member 10.

Passages 42 terminate at a plurality of laterally-spaced locations, with four of pins 44 blocking a portion of the cross-section of each of other than the peripheral passages 42. The presence of four pins 44 exerts duct-forming shearing forces on the material being extruded through each passage and causes the material to flow transversely to fill the entire volume of recessed area 46 between upstream end 48 and the exit face of plate member 40. Preferably, and as illustrated in FIGS. 2 and 3, pins 44 are rectangular solids having a square cross-section in a plane transverse of the flow direction, hollow passages 42 having a circular cross-section, and pins 44 and passages 42 are of constant cross-section along their length.

As illustrated in the embodiments of FIGS. 1 and 4, and 2 and 3, it is preferred that the exit ends of the passage be in a common plane, and that the inlet end of the recessed area and the upstream end of the pins lie in the same common plane.

With reference to the process followed by the apparatus of FIG. 1, a batch of thoroughly mixed plastic, ceramic material is transferred to the interior of barrel member 22. Preferably, the interior of the extruder is exhausted by vacuum to remove all air from the admixture prior to beginning the extrusion operation. Ram 24 is used to force material through plate member 10 and form a length of material containing a plurality of longitudinally-extending ducts at closely spaced intervals across the cross-section of the extrudate.

Generally, the pressure at the upstream face of die plate 10 during extrusion will be from 100–3000 psi depending on the plasticity of the mix being extruded.

The webbed extrudate is cut into articles of discrete length, preferably by a very fine diameter wire, such as a steel or tungsten wire of about 0.002 inch diameter. The use of a cutting wire has been found to be far superior to use of a knife as a cutting means, as a knife generally causes tearing of the duct walls, and thus blocks easy passage of fluid through the resulting article. Generally, it is desirable to use the finest wire available which will withstand the stress involved in the cutting operation.

The duct-containing web members cut to discrete lengths as described above are dried, preferably at room temperatures for a minimum of 8 hours. A slow drying step is necessary to avoid cracking. It is desirable to keep the ends of the articles open to access by a drying fluid, and to loosely cover the longitudinally-extending surface or surfaces of the article to promote drying of interior ducts of the article at about the same rate as the exterior surface of the article. Desirably, the cut lengths are allowed to air dry at room temperatures for a minimum of 8 hours. The articles can then be placed in a forced air oven and heated from room temperature to about 110°C over a 4-hour period and held at 110°C for a minimum of 1 hour. The above-described drying procedure is desirable to avoid cracking of the cut length of ceramic article.

In accordance with the invention, the dried shapes are fired in either a gas or electrically-heated kiln. The shapes are desirably placed on their side and supported on a layer of high-purity silica sand. Care should be taken to insure that shapes are shielded from direct heat from the heating source. This can be accomplished by using muffle plates. In general, it is desirable to conduct the heating schedule with the following criteria in mind: (1) decomposition and dehydration of various clay, talc, and binder components; (2) formation of intermediate microstructural phases; and (3) formation of final microstructural phases. A typical heating schedule is described in the examples below.

In the embodiment of the ceramic article of this invention illustrated in FIG. 5, longitudinally-extending circular ducts 15 extend the length of cylindrical article 17. Such an article 17 formed of cordierite has a longitudinal compressive strength of about 5000 psi and a transverse compressive strength along any axis transverse of the longitudinal axis of the article of between about 400–700 psi. Generally, transverse compressive strength varies from about 8 to 14% of the longitudinal compressive strength of the fired ceramic articles.

The ratio of transverse compressive strength to longitudinal compressive strength is considerably higher than achieved by prior art high surface area ceramic articles. For example, a cordierite article containing rectangular, longitudinal ducts displays a low transverse compressive strength of about 50 psi along a transverse axis that splits the 90° intersection of a pair of duct walls.

The articles of the present invention can be fabricated to have a geometric surface area of over 50 sq. in. per cubic inch of space taken up by the exterior of the article. For example, for a cylindrical article, over 40 sq. in. of internal duct surface can be provided per cubic inch of volume required to emplace the cylindrical article as measured by Volume = $\pi r^2 l$ where $\pi$ is 3.1417, r is the radius of the cylindrical article and l is the length of the cylindrical article.

EXAMPLES 1–10

The following examples illustrate compositions extruded successfully in operations in accordance with the disclosure of this invention. In the examples and throughout the specification, all parts and percentages of ingredients are calculated by weight unless otherwise specified. Unless otherwise stated, all screen sizes are U.S. Standard.

In these examples, ceramic articles are formed from ten different batches of ingredients as listed below. Each batch is blended by first mixing the dry ingredients about 5 minutes in a paddle mixer to uniformly disperse these ingredients. Subsequently, water, aqueous solution, or liquid binder, used singly or in combination is added to the batch to promote plasticity. Thorough blending imparts extrusion consistency to the batch and thus ensures a well-formed shape. Wet blending times in a paddle mixer vary from about 5 to about 10 minutes.

EXAMPLE 1

325 grams Georgia kaolin (−325 mesh)
175 grams prochlorite talc (−325 mesh)
100 ml of 3.8% sodium ligno-sulfonate solution
35 ml of 12.5% polyvinyl alcohol solution

EXAMPLE 2

325 grams Georgia kaolin (−325 mesh)
175 grams prochlorite talc (−325 mesh)
145 ml of 3.8% Darvan "C" solution (R. T. Vanderbilt Co.)

EXAMPLE 3

1925 grams Georgia kaolin (−325 mesh)
350 grams ball clay (−325 mesh)
1225 grams prochlorite talc (−325 mesh)
745 ml 3.8% sodium ligno-sulfonate solution
430 ml 9.1% polyvinyl alcohol solution

EXAMPLE 4

1925 grams Georgia kaolin (−325 mesh)
350 grams ball clay (−325 mesh)
1225 grams prochlorite talc (−325 mesh)
1350 ml of 2% methylcellulose solution

EXAMPLE 5

1736 grams Georgia kaolin (−325 mesh)
315 grams ball clay (−325 mesh)
1099 grams prochlorite talc (−325 mesh)
350 grams zirconium silicate (−200 mesh)
24.5 grams dry methylcellulose powder
1050 ml distilled water

EXAMPLE 6

1736 grams Georgia kaolin (−325 mesh)
315 grams ball clay (−325 mesh)
1099 grams prochlorite talc (−325 mesh)
350 grams calcined clay (−100 + 200 mesh)
24.5 grams dry methylcellulose powder
1100 ml distilled water

EXAMPLE 7

2625 grams Georgia kaolin (ground to −325 mesh)
350 grams ball clay (−325 mesh)
350 grams prochlorite talc (−325 mesh)
175 grams magnesium carbonate (−325 mesh Reagent Grade)
35 grams methylcellulose powder
1485 ml distilled water

EXAMPLE 8

1350 grams Georgia kaolin (−325 mesh)
600 grams ball clay (−325 mesh)
1050 grams prochlorite talc (−325 mesh)
900 grams zirconium silicate (−200 mesh)
68.25 grams colloidal magnesium aluminum silicate (R. T. Vanderbilt Co.)
900 ml distilled water

EXAMPLE 9

8925 grams zirconium silicate (−200 mesh)
1050 grams ball clay (−325 mesh)
525 grams Georgia kaolin (−325 mesh)
210 grams Vee Gum-T
1440 ml distilled water

EXAMPLE 10

850 grams −200 mesh $Al_2O_3$ (Tabular)
130 grams −325 mesh ball clay
20 grams colloidal magnesium aluminum silicate
130 ml distilled water The following materials used in the Examples have the following analysis:

|  |  | Prochlorite[1] Talc | Georgia[1] Kaolin | Calcined[2] Clay | Ball Clay[1] (Weldon) | Ball Clay[1] (Victoria) |
|---|---|---|---|---|---|---|
| | $SiO_2$ | 30.70 | 45.45 | 54–55 | 52.01 | 57.17 |
| | $Al_2O_3$ | 22.0 | 38.26 | 42–43 | 30.34 | 28.45 |
| | $Fe_2O_3$ | 1.82 | 0.73 | 0.75 | 0.97 | 0.96 |
| | $TiO_2$ | 0.08 | 1.25 | 0.08 | 1.64 | 1.69 |
| CHEMICAL | $MnO_2$ | Trace | — | — | — | — |
| ANALYSIS | CaO | 0.20 | 0.21 | 0.10 | 0.35 | 0.26 |
| | MgO | 32.08 | 0.04 | 0.10 | 0.17 | 0.20 |
| | $Na_2O$ | 0.25 | 0.11 | 0.10 | 0.20 | 0.31 |
| | $K_2O$ | 1.20 | 0.21 | 1.5–2.0 | 0.38 | 0.21 |
| | LOI | 12.68 | 13.47 | — | 13.85 | 10.78 |
| | TOTAL (%) | 99.76 | 99.89 | — | 99.91 | 100.03 |
| | % minus 30 | 85.6 | — | — | — | — |
| | % minus 10 | 31.5 | 88.5 | — | 97.5 | 88.0 |
| PARTICLE | % minus 5 | 15.7 | 78.0 | — | 94.5 | 82.0 |
| SIZE | % minus 2 | 6.8 | 59.5 | — | 85.0 | 75.0 |
| IN MICRONS | % minus 1 | 3.6 | 50.0 | — | 73.5 | 65.5 |
| | % minus 0.5 | 1.9 | 32.0 | — | 58.0 | 52.0 |
| | % minus 0.2 | 1.0 | 12.5 | — | 34.5 | 29.5 |
| | % minus 200 Mesh | 99.5 | — | 99.9 | — | — |
| GRIND SPECS | % minus 325 Mesh | — | — | — | — | — |

[1]Products of United Sierra Div., Cyprus Mines Corp.
[2]Product of English China Clays Sales Co. Ltd.

The thoroughly mixed batch is transferred to the material cylinder of an extruder as schematically illustrated in FIG. 1. The admixed compositions are subjected to a vacuum in the extruder to remove air therefrom and are extruded through a 3 in. diameter die having the arrangement of passages 12 and pins 14 illustrated in FIGS. 1 and 4. Extrusion speed for the various batches is varied between about 10 and 100 inches of product per minute depending on the extrusion force required to force the material through the die and properly form a continuous web structure. The pressure at the upstream face of the die varies from 300–3000 psi depending on the plasticity of the mixture being extruded.

The extruded material is cut into the desired cylindrical lengths of about 48 inches using a 0.002 inch diameter tungsten wire. The cut lengths are allowed to dry at room temperature for about 8 hours with the cylindrical surface loosely wrapped with porous paper or plastic film. The lengths are then unwrapped, cut into shorter lengths, and placed in a forced air oven and heated from room temperature to 110°C over a four-hour period and held at 110°C for a minimum of 1 hour.

The dried shapes are fired in a gas fired kiln. The shapes are first placed on their side and are supported on a layer of highpurity silica sand. Care is taken to ensure that the shapes are shielded from direct heat from the heating source. This is accomplished by using muffle plates. A typical heating schedule is as follows:

HEATING SCHEDULE

| | | |
|---|---|---|
| 0 to 400°C | at | 100°C/Hr |
| 30 min. | at | 400°C |
| 400°C to 490°C | at | 90°C/Hr |
| 1 Hr | at | 490°C |
| 490 to 590°C | at | 90°C/Hr |
| 1 Hr | at | 590°C |
| 590 to 620°C | at | 60°C/Hr |
| 1 Hr | at | 620°C |
| 620 to 780°C | at | 90°C/Hr |
| 30 min. | at | 780°C |
| 780 to 980°C | at | 100°C/Hr |
| 30 min. | at | 980°C |
| 980 to 1080°C | at | 100°C/Hr |
| 1 Hr | at | 1080°C |
| 1080 to 1180°C | at | 50°C/Hr |
| 30 min. | at | 1180°C |
| 1180 to 1300°C | at | 50°C/Hr |
| 2 Hr | at | 1300°C |
| COOL | | |

The fired articles have the hexagonally packed duct arrangement of FIG. 5. The cordierite articles of Examples 1–8, and 10, exhibit a longitudinal compressive strength of about 5000 psi and a transverse compressive strength that varies from about 400 to 700 psi, and exhibit about 15–18% water absorption after firing.

EXAMPLE 11

In this Example, 1400 grams Georgia kaolin; 400 grams of Victoria clay; and 1400 grams talc, each having the original analysis listed above and then screened to remove +100 mesh material; and 800 grams of fused cordierite (−200 mesh) are dry blended in a paddle mixer for 5 minutes. Subsequently, 60 grams of Vee Gum-T (a colloidal magnesium aluminum silicate, sold by R. T. Vanderbilt Co.), and 1040 ml of distilled water are added and the mixture is blended for 5 more minutes in a paddle mixer.

The thoroughly mixed batch is transferred to the barrel of an extruder as schematically illustrated in FIG. 1. The admixed composition is subjected to a vacuum in the extruder to remove air therefrom and is extruded through a 5 in. diameter die having the arrangement of passages 12 and pins 14 illustrated in FIGS. 1 and 4. The die has a thickness of about 0.250 and the pins are about 0.125 in. long. The pins are densely packed, about 154 pins per square inch of downstream face of the die. Extrusion speed for the batch is about 36 inches of product per minute. The pressure at the upstream face of the die is about 200 psi.

The extruded material is cut into cylindrical shapes having a length of about 7 inches using a 0.002 inch diameter tungsten wire. The cylindrical shapes are allowed to dry at room temperature for about 8 hours with the cylindrical wall surface loosely wrapped with paper or plastic sheet. The lengths are then placed in a forced air oven and heated from room temperature to 110°C over a four-hour period and held at 110°C for 1 hour.

The dried shapes are fired in a gas fired kiln. The shapes are first placed on their side and are supported on a layer of highpurity silica sand. Care is taken to ensure that the shapes are shielded from direct heat from the heating source. This is accomplished by using muffle plates. The heating schedule is the same as described in Examples 1–10.

The resulting fired cordierite articles have a longitudinal compressive strength of about 5000 psi and a transverse compressive strength of about 500 psi. The article contains circular ducts with the axes of ducts aligned with the axis of the cylindrical article.

Figure 7:
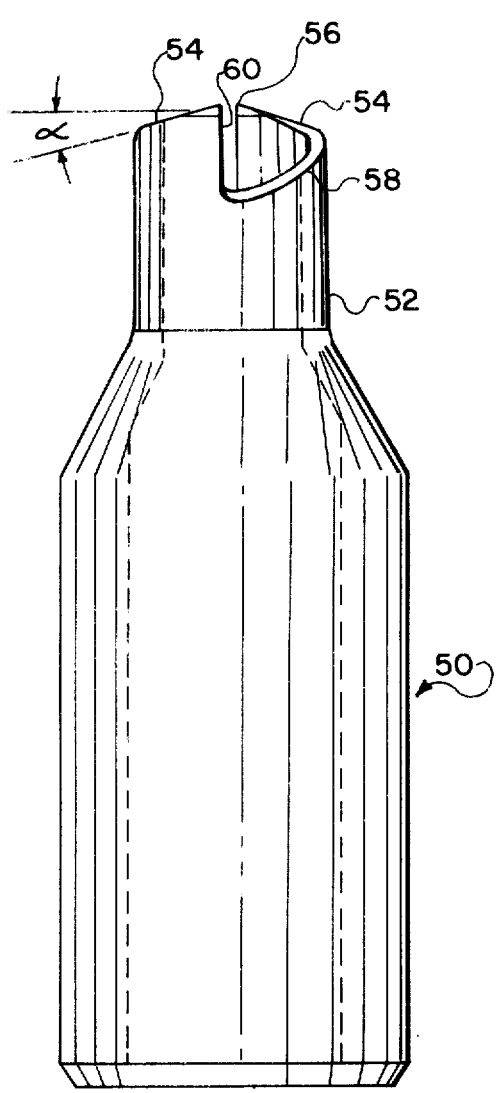
FIG. 7 is an elevation of a hollow mill cutting tool used in forming the die member illustrated in FIGS. 1 and 4.
Figure 8:
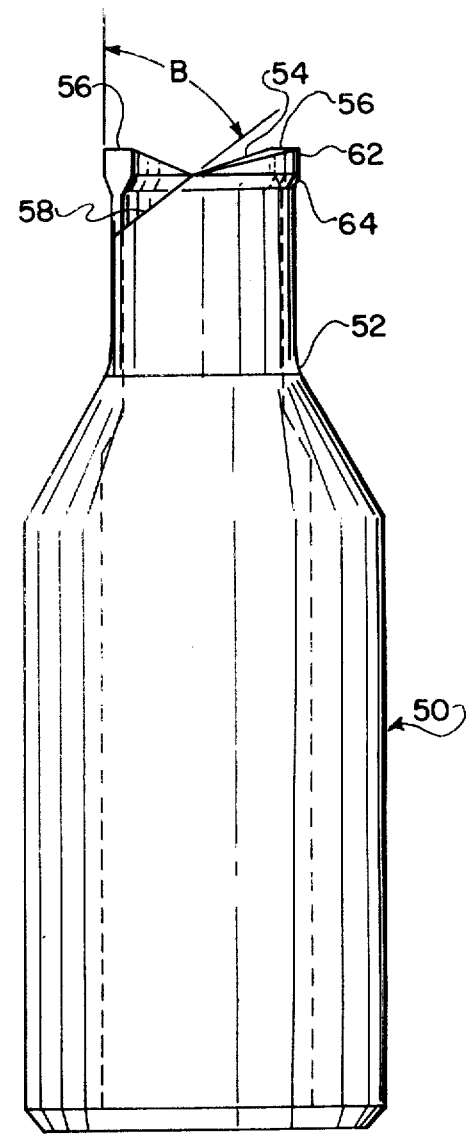
FIG. 8 is a view of the hollow mill cutting tool of FIG. 7 in which the tool has been rotated 90° in a clockwise direction about its axis with respect to its position in FIG. 7.

FIGS. 7 and 8 illustrate an embodiment of a hollow mill cutting tool that is particularly adapted for forming cylindrical pins, such as pins 14 illustrated in FIGS. 1 and 4. In general, the cutting tool forms a cylindrical pin by removing material that lies adjacent the cylindrical surface of the pins.

The cutting tools of FIGS. 7 and 8 include a generally cylindrical member 50 that terminates in a tip portion 52 that has a toroidal cross-section. The axis of tip portion 52 is aligned with the axis of cylindrical member generally 50.

Tip portion 52 includes a pair of forward helical surfaces 54 that each terminate at their forward end in a cutting edge 56. Cutting edges 56 extend across the thickness of the toroidal cross-section of tip member 52. Each forward helical surface extends rearwardly along a cylindrical path from cutting edge 56 at an angle as illustrated in FIG. 7 of from 9° to 11° with a plane transverse of the longitudinal axis of cylindrical member, generally 50. The angle $\alpha$, as illustrated in FIG. 7 is important to obtaining good cutting action from the cutting tool, which as viewed in FIG. 7, is rotated in a clockwise direction during cutting operations. As illustrated in FIG. 7, the angle $\alpha$ is defined as the angle between a plane transverse of the longitudinal axis of cylindrical member generally 50, and the angle at which forward helical surface 54 extends rearwardly along a cylindrical path from cutting edge 56. If the angle $\alpha$ is less than 9°, very little cutting action is obtained. If the angle $\alpha$ is over 11°, the strength of the cutting tool is reduced near the cutting edges. Preferably, the angle $\alpha$ is 10°.

A plurality of back helical surfaces 58 are provided with each back helical surface 58 connected to one forward helical surface 54 preferably with a smoothly-curved portion connecting these two helical surfaces.

Each back helical surface adjacent its rearward end, and at approximately a longitudinal distance from cutting edge 56 that corresponds to the desired length of the cylindrical pin being machined, is inclined at an angle $\beta$ as illustrated in FIG. 8 of at least 55° to a plane parallel to the axis of cylindrical member 50, with a presently preferred angle $\beta$ being 55°. It is important that back helical surface be inclined at an angle of at least 55° to insure the presence of clearance for discharge of displaced material away from the cutting tool during cutting operations.

A plurality of generally longitudinally-extending surfaces 60 are provided, with one of the longitudinally-extending surfaces connected at one end to one of the forward helical surfaces 54 to form a cutting edge 56. The other end of each longitudinally-extending surface 60 is connected to the rear end of an adjacent back helical surface 58.

What is claimed is:

1. A ceramic article comprising:

a fired monolithic cordierite article having a plurality of parallel circular ducts separated by webs, said ducts extending across the article to provide for fluid flow through the article, a majority of said parallel circular ducts being surrounded by six other circular ducts with the axes of the six surrounding ducts being spaced an approximately equal distance from the axis of the circular duct they surround, the number of said ducts per square inch of article surface in a plane transverse of the parallel axes of said ducts being at least 100, said article having a transverse compressive strength of at least about 5% of its longitudinal compressive strength.

2. The catalyst support of claim 1 in which said article has a longitudinal compressive strength of about 5000 psi and a transverse compressive strength along any axis transverse of the longitudinal axis of the article of between about 400–700 psi.

3. The fired article of claim 1 in which the diameter of the circular ducts is about 0.055 in. and the number of circular ducts per square inch is about 225.

4. The fired cordierite article of claim 3 which has a cylindrical shape, and in which the axes of the circular ducts are aligned with the axis of the cylindrical article.

* * * * *